United States Patent
Cai et al.

(10) Patent No.: US 11,582,653 B2
(45) Date of Patent: Feb. 14, 2023

(54) SLICING POLICY FOR USER EQUIPMENT

(71) Applicant: T-Mobile Innovations LLC, Overland Park, KS (US)

(72) Inventors: Zheng Cai, Fairfax, VA (US); Zheng Fang, McLean, VA (US); Yu Wang, Fairfax, VA (US); David Z. Sun, Broadlands, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 214 days.

(21) Appl. No.: 17/154,908

(22) Filed: Jan. 21, 2021

(65) Prior Publication Data
US 2022/0232435 A1 Jul. 21, 2022

(51) Int. Cl.
| | |
|---|---|
| *H04W 36/00* | (2009.01) |
| *H04W 36/08* | (2009.01) |
| *H04W 36/22* | (2009.01) |
| *H04W 36/32* | (2009.01) |

(52) U.S. Cl.
CPC ....... *H04W 36/0072* (2013.01); *H04W 36/08* (2013.01); *H04W 36/22* (2013.01); *H04W 36/32* (2013.01)

(58) Field of Classification Search
CPC . H04W 36/0072; H04W 36/08; H04W 36/22; H04W 36/32; H04W 36/00837; H04W 48/08; H04W 48/16; H04W 72/0453; H04W 76/10; H04W 48/18; Y02D 30/70
USPC ............. 370/252, 329, 331; 455/63.1, 114.2, 455/278.1, 296, 436–454
See application file for complete search history.

(56) References Cited

U.S. PATENT DOCUMENTS

| | | | |
|---|---|---|---|
| 8,213,867 B2 * | 7/2012 | Zhang | H04W 72/085 455/67.11 |
| 9,226,295 B2 | 12/2015 | Negus et al. | |
| 9,578,643 B2 | 2/2017 | Negus | |
| 9,602,156 B2 | 3/2017 | Wloczysiak | |
| 9,918,321 B1 * | 3/2018 | Marupaduga | H04W 36/06 |
| 10,244,415 B2 | 3/2019 | Zhang et al. | |
| 10,681,710 B2 | 6/2020 | Wang et al. | |

(Continued)

OTHER PUBLICATIONS

"3rd Generation Partnership Project; Technical Specification Group Services and System Aspects; Study on enhancement of network slicing; Phase 2 (Release 17)"; 3GPP TR 23.700-40; Oct. 2020; pp. 1-216; V1.1.0; 3GPP; France.

(Continued)

*Primary Examiner* — Michael Y Mapa (57) ABSTRACT

User circuitry within a wireless User Equipment ("UE") in need of a network slice or a handoff between cells identifies a slice service type. The user circuitry processes an uplink interference threshold of a target cell based on the slice service type. The user circuitry identifies a preferred operating frequency band based on the slice service type and the uplink interference threshold of the target cell. The user circuitry transfers a service request for a wireless data service having the slice service type over the preferred operating frequency band to network circuitry. The network circuitry wirelessly exchanges data with a wireless access node associated with the target cell over the preferred operating frequency band to establish a packet data unit session comprising the slice service type.

20 Claims, 8 Drawing Sheets

(56) References Cited

U.S. PATENT DOCUMENTS

| | | |
|---|---|---|
| 10,708,850 B2 | 7/2020 | Malladi et al. |
| 2013/0077551 A1* | 3/2013 | Lo ..................... H04W 72/0406 |
| | | 370/312 |
| 2018/0249456 A1* | 8/2018 | Liu ....................... H04L 5/0053 |
| 2018/0352485 A1 | 12/2018 | Andersson et al. |
| 2020/0120547 A1* | 4/2020 | Han ..................... H04W 36/04 |

OTHER PUBLICATIONS

"Discussion on support of RAN slicing"; 3GPP TSG-RAN WG2 Meeting #111 electronic; Aug. 2020; 5 pages; R2-2007421; 3GPP; France.

"Improvements to Site Selection Diversity Transmission (SSDT)"; TSG-RAN Working Group 1 meeting #3; Mar. 1999; pp. 1-5; TSGR1#3(99)187; Motorola; Sweden.

* cited by examiner

| Slice Service Type | Loading Threshold | Uplink Interference Threshold | UE Mobility Condition | OFB Priority List |
|---|---|---|---|---|
| SST1 | Low | Low | Stationary | OFB1, OFB2, OFB3 |
| SST2 | Mid | Mid | Fast | OFB2, OFB4, OFB5 |
| SST1 | High | Low | Slow | OFB6, OFB7, OFB8 |
| SST3 | Mid | Low | Stationary | OFB1, OFB3, OFB9 |
| SST2 | Low | High | Fast | OFB7, OFB6, OFB5 |
| ... | ... | ... | ... | ... |

SLICING POLICY FOR USER EQUIPMENT

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes (e.g., base stations such as eNode B, gNode B) which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

Each wireless access node serves one or more cells that are each operating at a selected radio frequency band (i.e., operating frequency band ("OFB")). The wireless user devices request sessions for communicating with external data networks through the wireless access nodes via a cell based on the user application that is to use the session for communication to external data networks. Certain radio frequency bands offer different advantages and disadvantages including latency, noise, connection throughput, spectrum efficiency, and the like. The applications using the session may have varying requirements associated with the radio frequency band such as, for example, low latency, high connection throughput, and the like. Network slicing provides a flexible logical network architecture for meeting service requirements. Slicing service types include, for example, enhanced Mobile Broadband (eMBB), Ultra Reliable Low Latency Communications (URLLC), and massive Machine Type Communications (mMTC). However, selecting a suitable cell for requesting the session with the slicing service type does not always result in an ideal configuration and can result in frequent cell reselection and service impact.

TECHNICAL OVERVIEW

User circuitry within a wireless User Equipment ("UE") in need of a network slice or a handoff between cells identifies a slice service type. The user circuitry processes an uplink interference threshold of a target cell based on the slice service type. The user circuitry identifies a preferred operating frequency band based on the slice service type and the uplink interference threshold of the target cell. The user circuitry transfers a service request for a wireless data service having the slice service type over the preferred operating frequency band to network circuitry. The network circuitry wirelessly exchanges data with a wireless access node associated with the target cell over the preferred operating frequency band to establish a packet data unit session comprising the slice service type.

DETAILED DESCRIPTION

Figure 1:
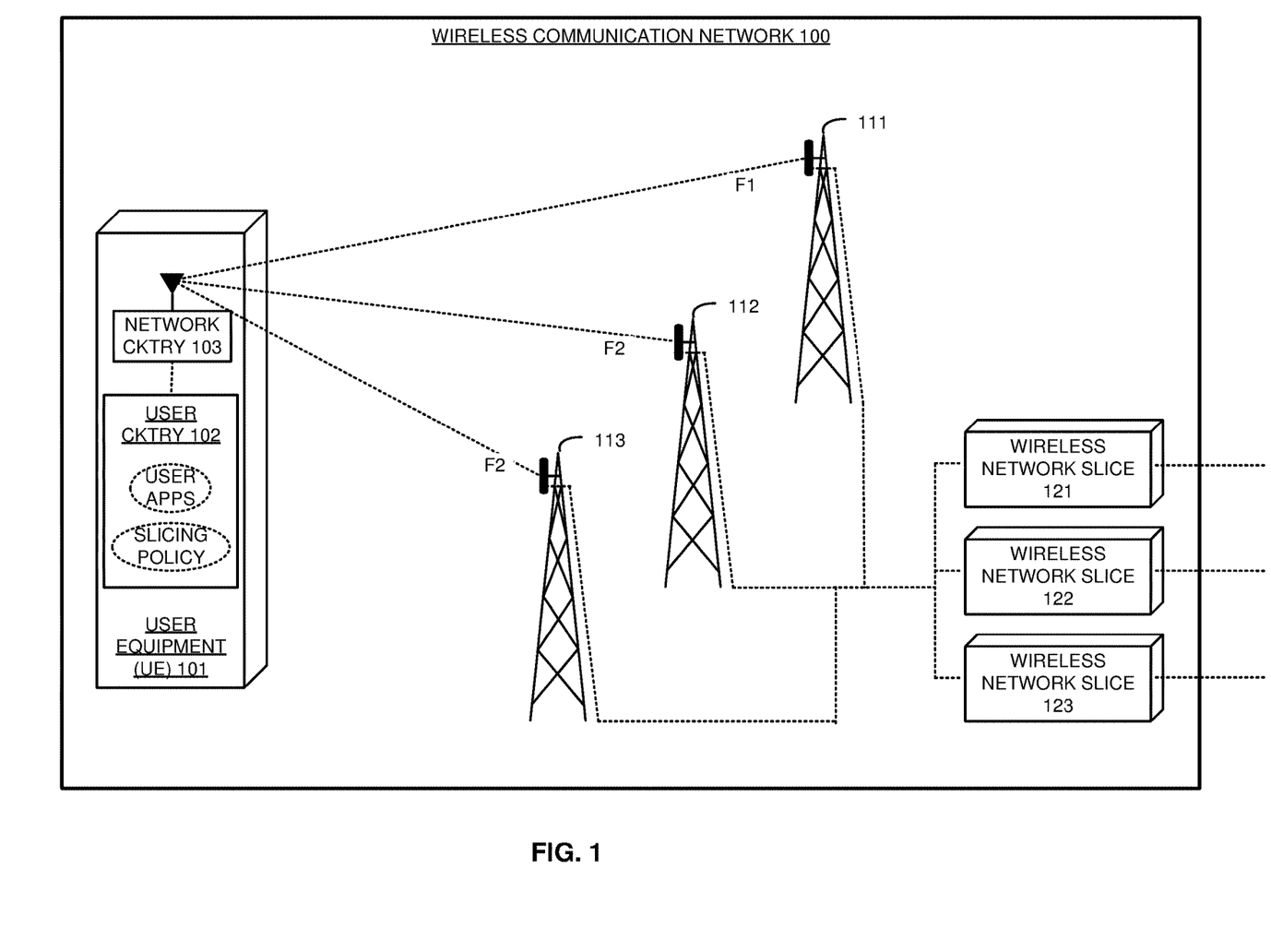
FIG. 1 illustrates a wireless communication network that serves a wireless User Equipment (UE) that requests network slices for user applications.

FIG. 1 illustrates wireless communication network 100 that serves wireless User Equipment (UE) 101. Wireless communication network 100 comprises wireless UE 101, wireless access nodes 111-113, and wireless network slices 121-123. UE 101 comprises user circuitry (CKTRY) 102 and network circuitry 103. User circuitry 102 comprises user applications (APPS) like augmented-reality, vehicle-control, atmospheric sensing, or some other user service. User circuitry 102 further comprises slicing policy which may include a slicing policy table, such as slicing policy table 600 as described with respect to FIG. 6. In some embodiments, the slicing policy may be stored in another format in memory of the UE 101 such that the UE 101 may identify a preferred operating frequency band for a network slice used for a user application. Wireless network slices 121-123 may comprise Ultra Reliable Low Latency Communication (URLLC) slices, enhanced Mobile Broadband (eMBB) slices, massive Machine Type Communication (mMTC) slices, default slices, backup slices, and/or some other type of network slices. The number of UEs, wireless access nodes, and wireless network slices that are depicted on FIG. 1 has been restricted for clarity, and wireless communication network 100 may comprise many more UEs, nodes, and slices.

Various examples of network operation and configuration are described herein. In some examples, user circuitry 102 executes a user application and identifies a slice service type based on an association between the user application and the slice service type. The user circuitry 102 uses the slicing policy to identify a preferred operating frequency band ("OFB") for the slice service type based on an uplink interference threshold of a target cell. The user circuitry transfers a service request for a corresponding wireless data service having the slice service type to network circuitry 103. Network circuitry 103 wirelessly exchanges signaling with wireless access node 111 over preferred OFB (F1) to select wireless network slice 122 having the slice service type identified based on the user application. Wireless access node 111 and wireless network slice 122 exchange the data over the preferred OFB (F1) to establish a packet data unit session for the user application using the network slice 122.

In some embodiments, network circuitry 103 may determine that it is not camped on wireless access node 111 and instead is camped on wireless access node 112 operating at a different OFB (F2). In such embodiments, network circuitry 103 may measure the preferred OFB (F1) to identify wireless access node 111. If the signal over F1 is sufficiently strong to be suitable based on the wireless UE 101 cell selection criteria, network circuitry 103 may perform a cell reselection to communicate with wireless access node 111 over the preferred OFB (F1). Once communication is established, network circuitry 103 wirelessly exchanges signaling with wireless access node 111 over preferred OFB (F1) to select wireless network slice 122 having the slice service type identified based on the user application. Wireless access node 111 and wireless network slice 122 exchange the data over the preferred OFB (F1) to establish a packet data unit session for the user application using the network slice 122.

Advantageously, UE 101 efficiently obtains the appropriate wireless network slices 121-123 over the appropriate or preferred OFB to obtain the best fit to service requirements of the application to limit service impact from frequent handover and the like. Moreover, UE 101 may use the slicing policy to identify the best OFB for the slice service type given characteristics of the UE and/or the wireless access node during initial slice setup and during handover to provide the best fit to service requirements of the application.

UE 101 and wireless access nodes 111-113 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Wireless access nodes 111-113 and wireless network slices 121-123 communicate over backhaul links that use metallic links, glass fibers, radio channels, or some other communication media. The backhaul links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 comprises a vehicle, sensor, robot, computer, phone, or some other data appliance with wireless communication circuitry. Wireless access nodes 111-113 are depicted as towers but wireless access nodes 111-113 may use other mounting structures or no mounting structure at all. Wireless access nodes 111-113 may comprise gNodeBs, eNodeBs, NB-IoT access nodes, LP-WAN base stations, wireless relays, and/or some other wireless network transceivers. UE 101 and wireless access nodes 111-113 comprise antennas, amplifiers, filters, modulation, and analog/digital interfaces. UE 101, wireless access nodes 111-113, and wireless network slices 121-123 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein. In some examples, wireless network slices 121-123 comprise User Plane Functions (UPFs), Gateways (GWs), and/or other network elements that are hosted by a Network Function Virtualization Infrastructure (NFVI).

Figure 2:
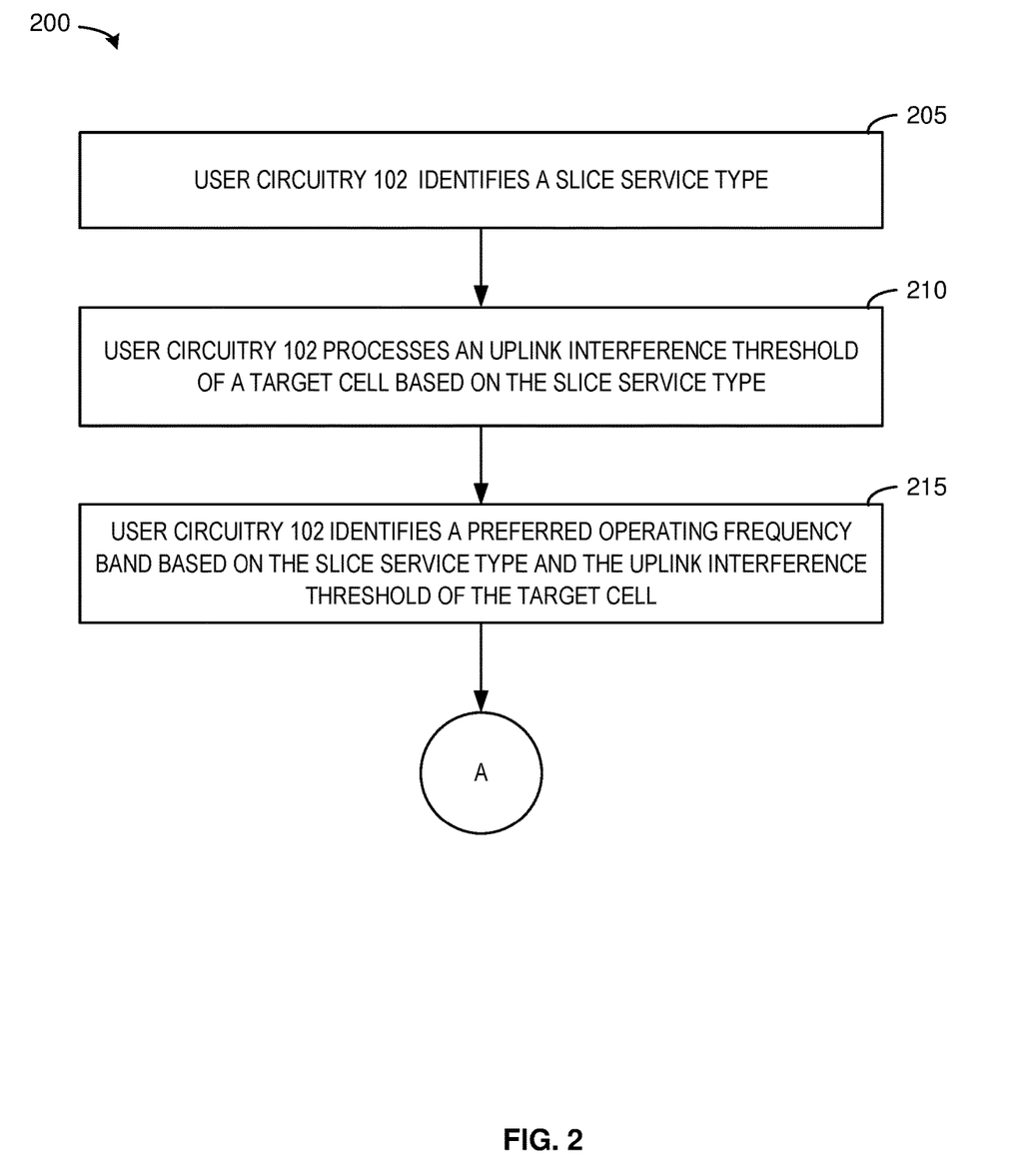
FIG. 2 illustrates the operation of the wireless communication network and the wireless UE to obtain a network slice using the preferred slice service type and operating frequency band for the user application.

FIG. 2 illustrates the operation 200 of wireless communication network 100 and wireless UE 101 to obtain a network slice using the preferred slice service type and operating frequency band for the user application. The operation is exemplary and may vary in other examples. In UE 101, user circuitry 102 identifies a slice service type. In some embodiments, the slice service type is identified based on an association of the slice service type with a user application for which a network slice will be used (205). Once the slice service type is identified, the user circuitry 102 processes an uplink interference threshold of a target cell based on the slice service type (210). For example, the user circuitry 102 may receive the uplink interference threshold of a current cell on which the UE is camped based on broadcast messages from the cell. Using the uplink interference threshold of the target cell and the slice service type, the user circuitry 102 may identify a preferred operating frequency band (215). For example, the user circuitry may search a slicing policy for the preferred operating frequency band based on the uplink interference threshold of the target cell and the slice service type. In some embodiments, the UE 101 may have a slicing policy table stored in memory such as slicing policy table 600 as described with respect to FIG. 6. The user circuitry may query the slicing policy table to obtain a ranked list of OFBs.

Figure 3:
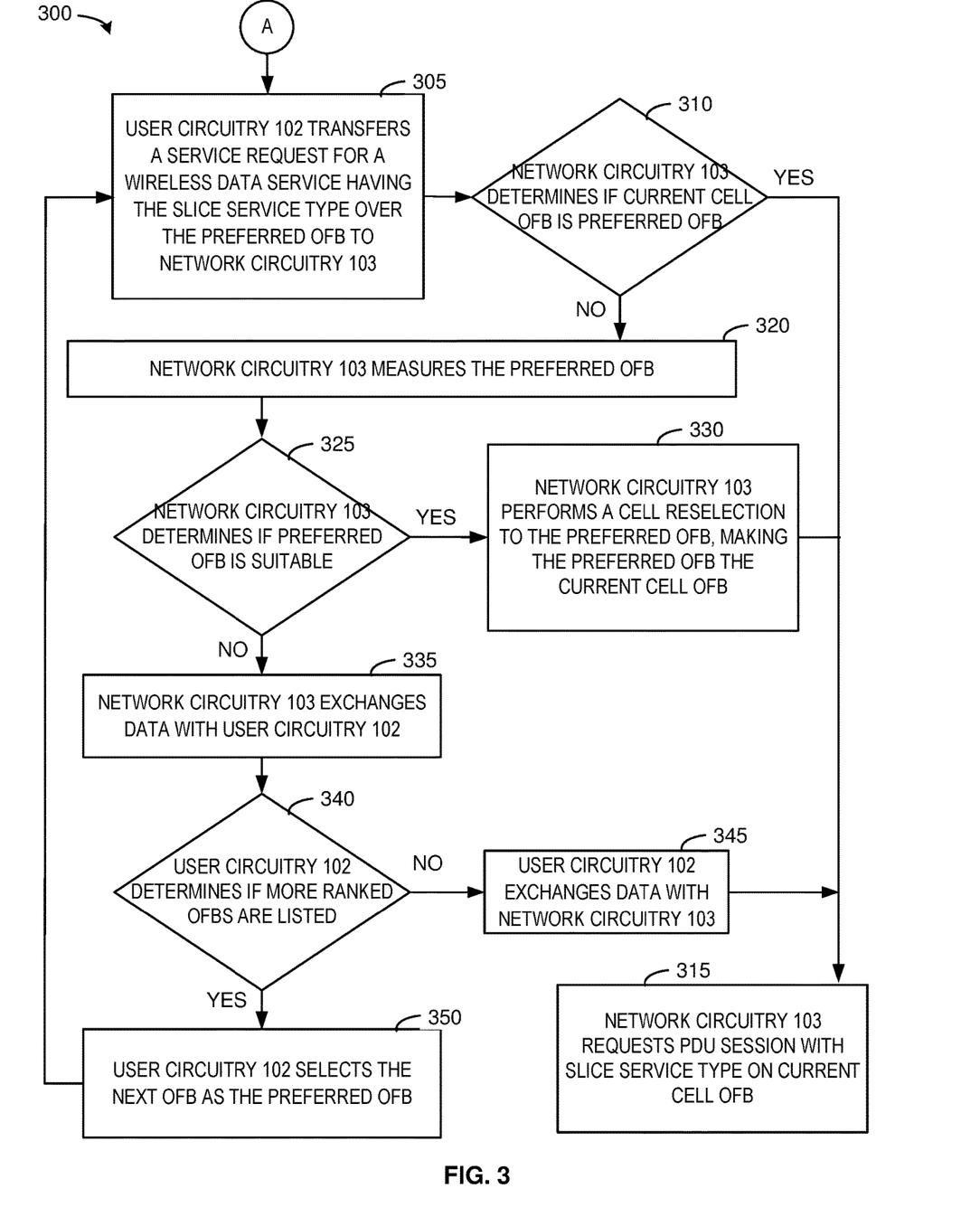
FIG. 3 illustrates the operation of the wireless communication network and the wireless UE to obtain a network slice using the preferred slice service type and operating frequency band for the user application.
Figure 6:
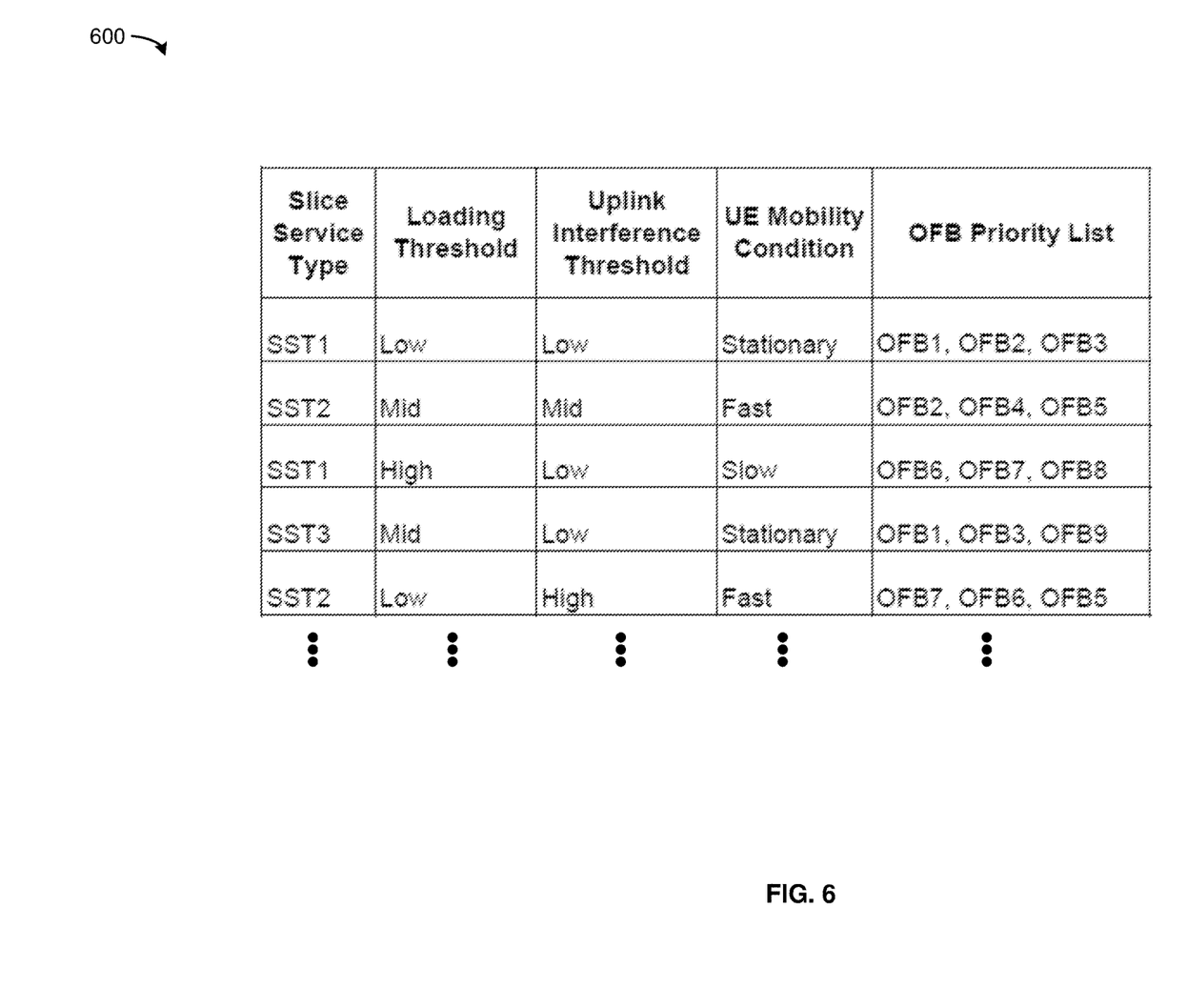
FIG. 6 illustrates an exemplary slicing policy table.

FIG. 3 illustrates additional operation 300 of wireless communication network 100 and wireless UE 101 to obtain the network slice using the preferred slice service type and operating frequency band for the user application. The user circuitry 102 transfers a service request for a wireless data service having the slice service type over the preferred operating frequency band to network circuitry 103 (305). In response to receiving the service request, the network circuitry 103 determines whether the wireless UE 101 is camped on a cell using the preferred OFB (310). If the current cell OFB is the preferred OFB, the network circuitry 103 exchanges data with the wireless access node (e.g., 111, 112, 113) to request a packet data unit ("PDU") session with the slice service type on the current cell OFB (315). If the current cell OFB is not the preferred OFB, the network circuitry 103 measures the preferred OFB (320). Based on the measurement, the network circuitry 103 determines if the preferred OFB is suitable (325). The preferred OFB is determined to be suitable based on the cell being suitable using cell selection criteria. Cell selection criteria may be established by the wireless UE 101 implementation and may define criteria thresholds including, for example, a minimum reference signal received power ("RSRP") or a minimum signal to interference plus noise ratio ("SINR") that are measured by the network circuitry 103. If the network circuitry 103 determines the preferred OFB is suitable, the network circuitry 103 performs a cell reselection to the cell operating at the preferred OFB, making the preferred OFB the current cell OFB (330). In some embodiments, the uplink interference threshold of the reselected cell may be processed by the user circuitry and the uplink interference threshold reviewed against the slicing policy to confirm the current cell OFB is preferred given the uplink interference threshold and slice service type. The network circuitry 103 performs the cell reselection by exchanging data with the wireless access node (e.g., 111, 112, 113) that is operating over the preferred OFB. Once the network circuitry 103 performs the cell reselection, the network circuitry 103 requests the PDU session with the slice service type on the current cell OFB (315). Once the PDU session is established, the network circuitry 103 exchanges data with the user circuitry 102 and with the wireless access node serving the cell to provide the wireless service for the application on the wireless UE 101.

If the network circuitry 103 determines the preferred OFB is not suitable, the network circuitry 103 exchanges this information with the user circuitry 102 (335). In response to receiving the information that the preferred OFB is not suitable, the user circuitry 102 determines if more ranked OFBs are listed (340). For example, the slicing policy may provide a matrix or table, such as slicing policy table 600 as described with respect to FIG. 6, that may provide a ranked list of preferred OFBs given the slice service type and other criteria including the uplink interference threshold of the target cell. If the user circuitry 102 determines that there are not more ranked OFBs listed, the user circuitry 102 exchanges further data with network circuitry 103 (345). The network circuitry 103 then requests a PDU session with the slice service type on the current cell OFB (315). Because the preferred OFB is not available, whether the ranked list have been cycled through or there was only one, if the preferred OFB is not available, the wireless UE may use the current OFB to establish the PDU for servicing the user application. If a preferred OFB becomes available, the user circuitry 102 and network circuitry 103 may have functionality to periodically, for example, measure the preferred OFBs for suitability. Upon identifying a cell serving over the preferred OFB as suitable, the network circuitry 103 may wirelessly exchange data with the target cell operating over the preferred OFB to perform a handover to the target cell to service the PDU session.

If the user circuitry 102 determines that there are additional ranked OFBs listed, the user circuitry 102 selects the next OFB from the ranked list as the preferred OFB (350). The user circuitry 102 then starts the loop again by transferring a service request for a wireless data service having the slice service type over the newly selected preferred operating frequency band to the network circuitry 103 (305).

Figure 4:
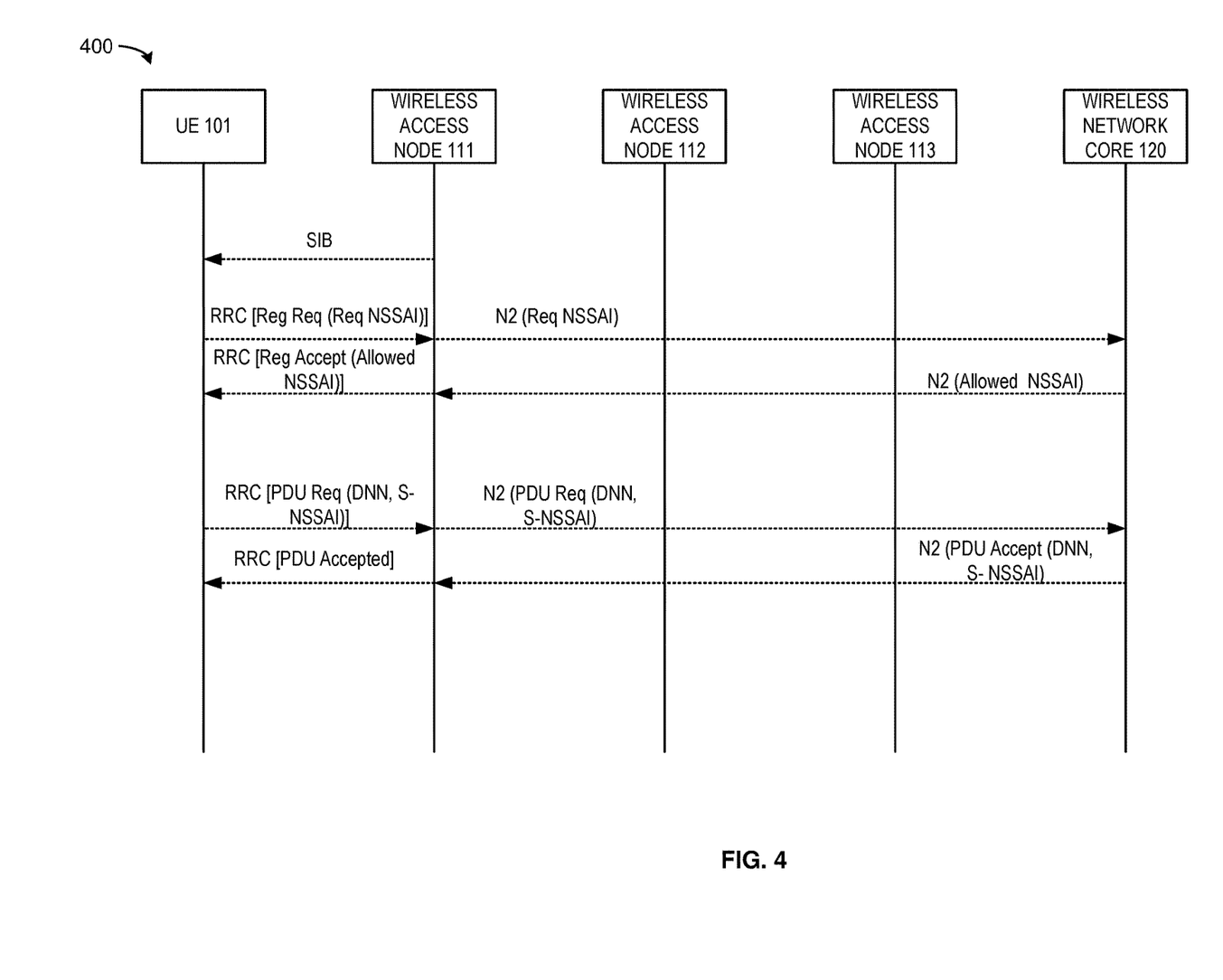
FIG. 4 illustrates a swim diagram of communication on the wireless communication network to obtain a network slice using the preferred slice service type and operating frequency band for the user application when camped on a cell having the preferred operating frequency band.

FIG. 4 illustrates a swim diagram 400 of communication on the wireless communication network to obtain a network slice using the preferred slice service type and operating frequency band for the user application when camped on a cell operating over the preferred operating frequency band. The operation is exemplary and may vary in other examples. In this example, wireless network slice 122 comprises the selected slice service type. In this example, UE 101 executes, for example, an augmented-reality application that requires a low-latency service, although other user applications with different service requirements could be used in other examples. Accordingly, in this example, the slice service type for network slice 122 may be URLLC.

The UE 101 is camped on a cell served by wireless access node 111. The wireless access node 111 periodically wirelessly broadcasts a System Information Block ("SIB") containing information about the wireless access node 111 including the cell uplink interference threshold. The network circuitry 103 may exchange data from the SIB with the user circuitry 102, and the user circuitry 102 may save the information from the SIB, including the uplink interference threshold, in memory.

In UE 101, user circuitry 102 executes the augmented reality application. Upon launching an application, the UE 101 initiates the Radio Resource Control ("RRC") connection setup procedure. During previous wireless communications with the wireless access node 111, the UE 101 may have been provided with allowed network slice information to which the UE 101 has access. A network slice is identified by its Single Network Slice Selection Assistance Information ("S-NSSAI"), which is a concatenation of a slice service type (8 bits) and a slice differentiator (24 bits). The slice differentiator is optional and used to differentiate between network slices having the same slice service type value. A set of one or more S-NSSAI are an NSSAI. The user circuitry 102 identifies the slice service type based on an association with the augmented reality application. In this example, for instance, the slice service type may be URLLC. The user circuitry 102 may process the uplink interference threshold of the target cell based on stored information obtained from the broadcast message from the serving cell. The user circuitry may then identify a preferred OFB using the slicing policy based on the slice service type and the uplink interference threshold. The user circuitry 102 transmits the service request to the network circuitry 103 requesting wireless data service having the slice service type URLLC and over the preferred OFB. In response, the network circuitry 103 identifies wireless access node 111 on which UE 101 is camped as operating at the preferred OFB. The network circuitry 103 transmits an RRC request that includes a requested NSSAI, typically generated from the already known allowed NSSAI or from previously configured NSSAI, and which includes the desired URLLC to wireless access node 111. Wireless access node 111 transmits the request to the wireless network core 120. The wireless network core 120 responds with the NSSAI that the wireless UE 101 are allowed to use. In this example, the wireless network core 120 allows the requested NSSAI. The wireless access node 111 transmits the allowed NSSAI information to the UE 101 wirelessly. Other wireless communications may be exchanged between UE 101, wireless access node 111, and wireless network core 120 that are not included here for clarity.

Upon receipt of the RRC registration acceptance, the network circuitry 103 initiates an RRC PDU request to the wireless access node 111 that includes the S-NSSAI of network slice 122 that is specific to the slice service type identified by the user circuitry for the augmented reality application. The request also includes the Data Network Name ("DNN") and may include other parameters not depicted here. The wireless access node 111 transmits the request to the wireless network core 120 and receives an acceptance from the wireless network core 120 that initiates the PDU. The wireless access node 111 transmits the acceptance to the network circuitry 103. The network circuitry 103 wirelessly exchanges data with the wireless access node 111 over the preferred OFB to provide the wireless service to the augmented reality application using network slice 122, and the network circuitry 103 exchanges data with user circuitry 102 to provide and request information for operating the augmented reality application.

Figure 5:
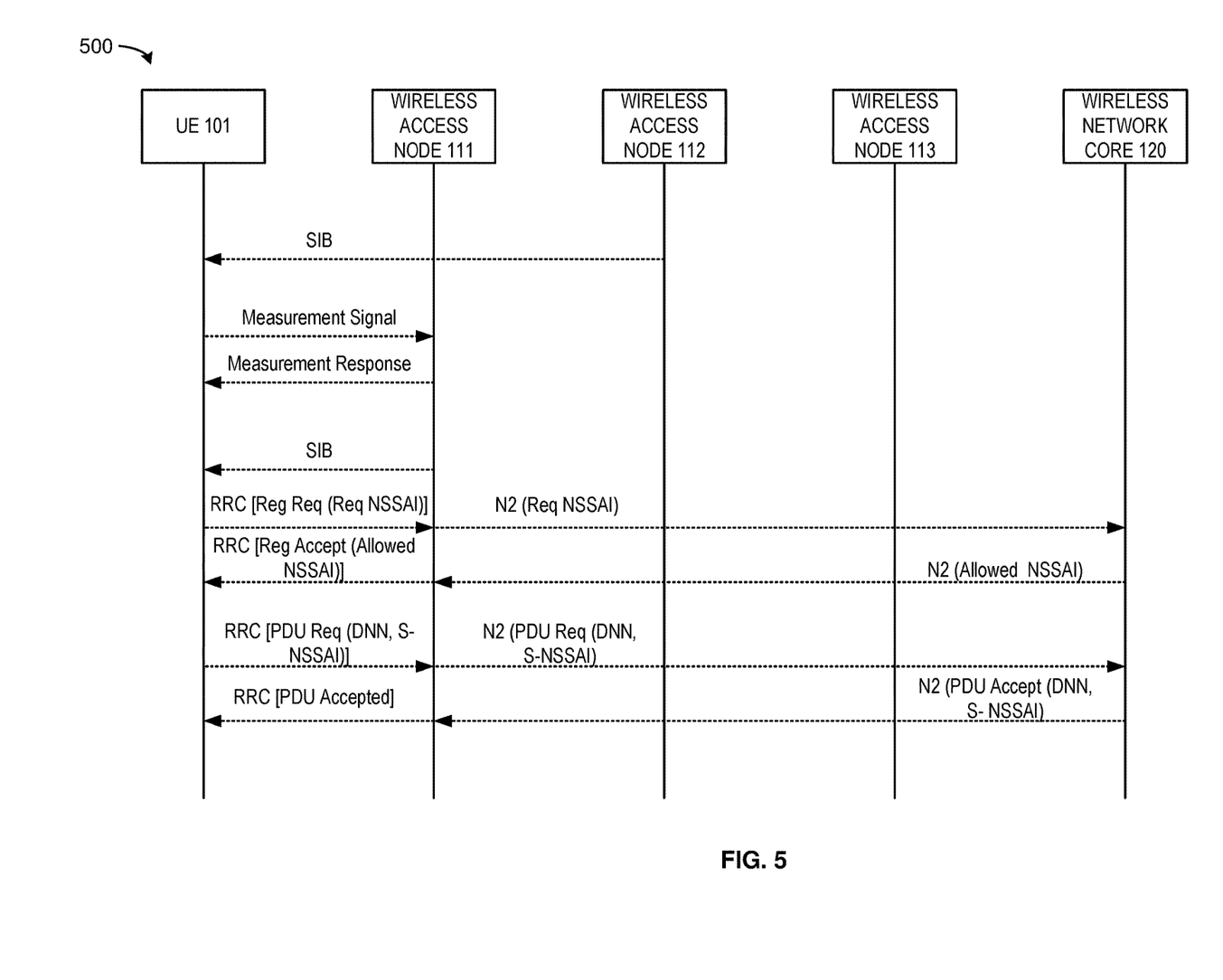
FIG. 5 illustrates a swim diagram of communication on the wireless communication network to obtain a network slice using the preferred slice service type and operating frequency band for the user application when not camped on a cell having the preferred operating frequency band.

FIG. 5 illustrates a swim diagram 500 of communication on the wireless communication network to obtain a network slice using the preferred slice service type and operating frequency band for the user application when camped on a cell not having the preferred operating frequency band. The operation is exemplary and may vary in other examples. In this example, wireless network slice 122 comprises the selected slice service type. In this example, UE 101 executes, for example, an augmented-reality application that requires a low-latency service, although other user applications with different service requirements could be used in other examples. Accordingly, in this example, the slice service type for network slice 122 may be URLLC.

In this example, UE 101 is camped on wireless access node 112, which periodically broadcasts SIBs containing information about the wireless access node 112 including the cell uplink interference threshold. The network circuitry 103 may exchange data from the SIB with the user circuitry 102, and the user circuitry 102 may save the information from the SIB, including the uplink interference threshold, in memory.

In UE 101, user circuitry 102 executes the augmented reality application. Upon launching an application, the UE 101 initiates the RRC connection setup procedure. The user circuitry 102 identifies the slice service type based on an association with the augmented reality application. In this example, for instance, the slice service type may be URLLC. The user circuitry 102 may process the uplink interference threshold of the wireless access node 112 based on stored information obtained from the broadcast message from the serving cell. The user circuitry may then identify a preferred OFB using the slicing policy based on the slice service type and the uplink interference threshold. In some embodiments, the slicing policy may also include a UE mobility status (e.g., stationary, fast, slow), a loading threshold of the target cell, or other parameters that may be entered to determine the preferred OFB or ranked list of preferred OFBs. The user circuitry 102 transmits the service request to the network circuitry 103 requesting wireless data service having the slice service type URLLC and over the preferred OFB. In response, the network circuitry 103 may determine that wireless access node 112 is not operating over the preferred OFB. The network circuitry 103 may then measure the preferred OFB and find wireless access node 111. In this example, the measurement signal from wireless access node (e.g., the RSRP, the Signal to Interference plus Noise Ratio ("SINR"), or other suitable measurement criteria based on cell selection criteria) is transmitted and the measurement response is evaluated by the network circuitry 103 to determine the wireless access node 111 is suitable. The network circuitry 103 then exchanges wireless data with the wireless access node 111 to perform a cell reselection. The network circuitry 103 may receive a broadcast SIB from the wireless access node 111 and transmit the information from the SIB, including the uplink interference threshold information, to the user circuitry 102, and the user circuitry 102 may store the information in response. In some embodiments, the user circuitry may access the slicing policy using the newly processed uplink interference threshold from the wireless access node 111 serving cell to ensure the preferred OFB remains the same. In this case, the preferred OFB remains the same either because the slicing policy confirms the preferred OFB or because the slicing policy is not accessed to confirm. As part of the cell reselection, the network circuitry 103 transmits an RRC registration request that includes a requested NSSAI including URLLC to wireless access node 111. Wireless access node 111 transmits the request to the wireless network core 120. The wireless network core 120 responds with the NSSAI that the wireless UE 101 are allowed to use. In this example, the wireless network core 120 allows the requested NSSAI. The wireless access node 111 transmits the allowed NSSAI information to the UE 101 wirelessly.

Upon receipt of the RRC registration acceptance, the network circuitry 103 initiates an RRC PDU request to the wireless access node 111 that includes the S-NSSAI of network slice 122 that is specific to the slice service type identified by the user circuitry for the augmented reality application. The request also includes the Data Network Name ("DNN") and may include other parameters not depicted here. The wireless access node 111 transmits the request to the wireless network core 120 and receives an acceptance from the wireless network core 120 that initiates the PDU. The wireless access node 111 transmits the acceptance to the network circuitry 103. The network circuitry 103 wirelessly exchanges data with the wireless access node 111 over the preferred OFB to provide the wireless service to the augmented reality application using network slice 122, and the network circuitry 103 exchanges data with user circuitry 102 to provide and request information for operating the augmented reality application.

FIG. 6 illustrates an exemplary slicing policy table 600. The slicing policy table may be a table stored in memory of the wireless UE 101 that can be used to identify the preferred OFB to use based on the slice service type and other criteria of the UE 101 and/or the serving cell. Slicing policy table 600 is exemplary and may include any number of parameters, entries, and values. The slicing policy table 600 may include the slice service type on which the user application may operate best. Slice service types refer to the expected network slice behavior in terms of the features and services that it supports. Slicing policy table 600 includes generic slice service types (i.e., "SST1," "SST2," "SST3") for the sake of example, however, there may be standardized slice service types including eMBB, URLLC, mMTC, and others. Slice service types may also include default slices, backup slices, and/or some other type of network slices. For a given slice service type, other parameters may be evaluated to identify the preferred OFBs. For example, the loading threshold of the serving cell or the uplink interference threshold of the serving cell may be used in the slicing policy. While shown as low, mid, and high values in the table 600, numerical values or other values may be used to determine the loading or uplink interference thresholds of the serving cells. These values may be obtained from the serving cell in broadcast messages such as SIBs. When the UE 101 receives a SIB, the network circuitry 103 may transmit the information to user circuitry 102 which, in response, stores the information so that it may be used to determine the appropriate OFB based on the current conditions for future slice requests. The UE 101 mobility condition may be a representation of the condition of the UE 101 as to whether it is stationary, moving slowly (e.g., user is walking), moving quickly (e.g., user is travelling in a vehicle), or some other condition. Given any set of the conditions, the slicing policy table 600 may provide an OFB priority list, which may be ranked listing of the OFBs that are most suitable for the given conditions. In some embodiments, more or fewer conditions may be used. For example, in some embodiments, the table 600 may include only the slice service type, the uplink interference threshold, and the corresponding OFB priority list. The user circuitry 102 may process the current conditions (e.g., slice service type associated with the user application requesting service, the uplink interference threshold of the current cell, the loading threshold of the current cell, the mobility condition of the UE) to identify the corresponding ranked listing of OFBs. For example, the first entry in the table 600 depicts that if the slice service type requested is SST1, the loading threshold of the serving cell is low, the uplink interference threshold is low, and the UE mobility condition is stationary, the preferred OFB is OFB1, if that is not available, the next best is OFB2, if that is not available, then the third best is OFB3.

In some embodiments, more or fewer OFBs may be included in any of the ranked lists even though slicing table 600 includes three OFBs per scenario.

Figure 7:
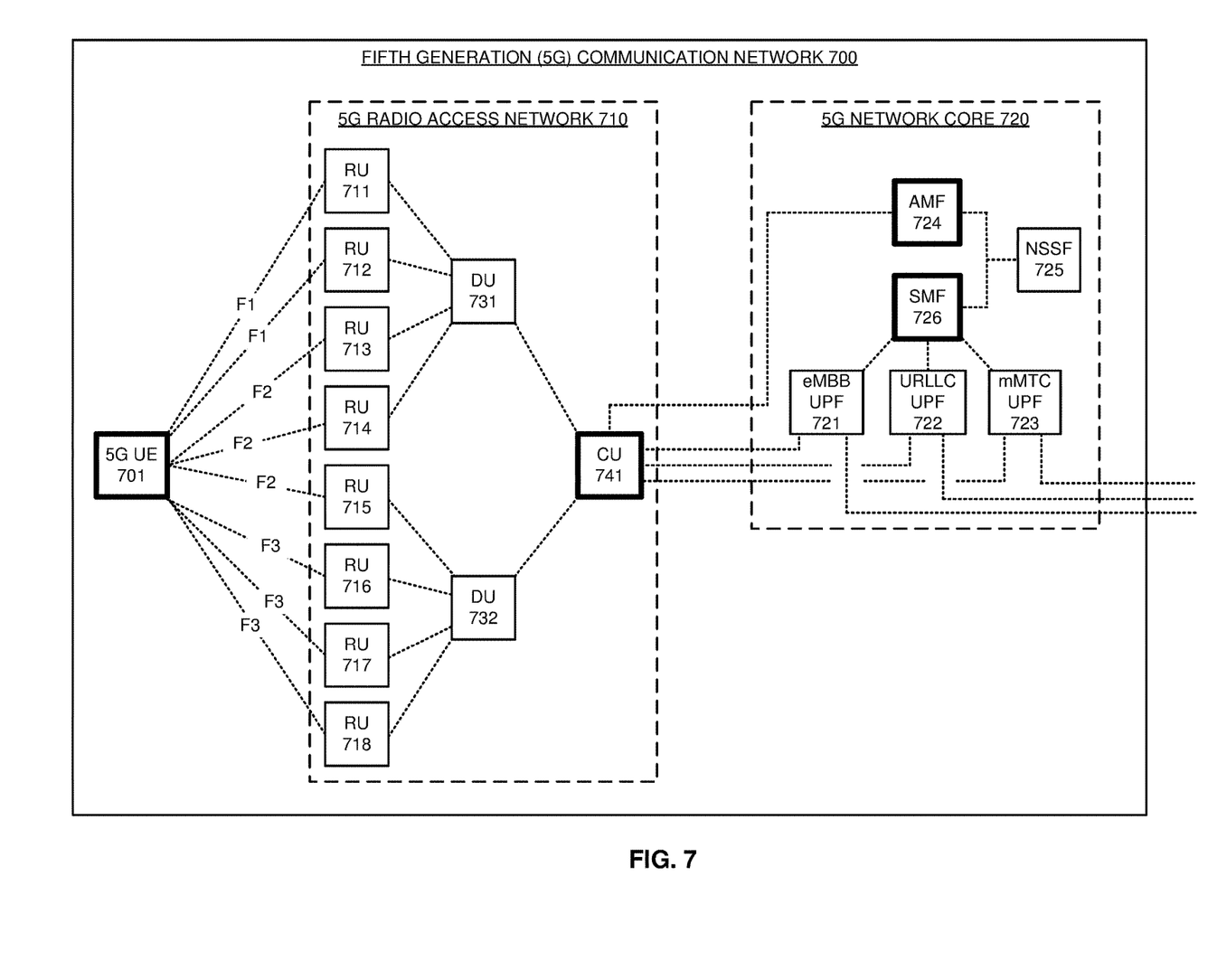
FIG. 7 illustrates a Fifth Generation (5G) communication network that serves a 5G User Equipment (UE) that identifies a preferred operating frequency band and slice service type for user applications.

FIG. 7 illustrates Fifth Generation (5G) communication network 700 that serves 5G User Equipment (UE) 701 that identifies a preferred operating frequency band and slice service type for user applications. 5G communication network 700 comprises an example of wireless communication network 100, although network 100 may differ. 5G communication network 700 comprises 5G UE 701, 5G Radio Access Network (RAN) 710, and 5G network core 720. 5G RAN 710 comprises Radio Units (RUs) 711-718, Distributed Units 731 and 732, and Centralized Unit (CU) 741. 5G network core 720 comprises eMBB User Plane Function (UPF) 721, URLLC UPF 722, mMTC UPF 723, Access and Mobility Management Function (AMF) 724, Network Slice Selection Function (NSSF) 725, and Session Management Function (SMF) 726. Other network functions are typically present but are omitted for clarity. RUs 711 and 712 use a first frequency band (F1) that is a few hundred megahertz wide. RUs 713-715 use a second frequency band (F2) that is several hundred megahertz wide. RUs 716-718 use a third frequency band (F3) that is a few thousand megahertz wide.

Based on signal strength, UE 701 wirelessly attaches to RU 711 over F1 and exchanges attachment signaling with CU 741 over RU 711 and DU 731. UE 701 sends requests for frequency bands F1-F3 and for eMBB, URLLC, and mMTC slices to AMF 724 over RU 711, DU 731, and CU 741. AMF 724 authorizes bands F1-F3 for UE 701 responsive to the UE request in the RRC exchange described in FIGS. 4 and 5. AMF 724 interacts with NSSF 725 to authorize UE 701 for the eMBB, URLLC, and mMTC slices responsive to the request in the RRC exchange described in FIGS. 4 and 5. AMF 724 indicates authorized F1-F3 bands and authorized eMBB, URLLC, and mMTC slices to UE 701 over CU 741, DU 731, and RU 711.

UE 701 executes an augmented reality application, identifies the URLLC slice service type based on the application, processes the uplink interference threshold for RU 711, and identifies the preferred OFB F3 based on the slicing policy. UE 701 selects the authorized URLLC slice based on the association with the augmented reality application. In response to selecting the URLLC slice and identifying F3 as the preferred OFB, UE 701 measures the F3 signal (e.g., SINR, RSRP or any other appropriate measurement), of RUs 716-718 and transfers a cell reselection request to F3. CU 741 selects RU 718 based on the best F3 signal. CU 741 directs UE 701 to attach to RU 718 over F3 and controls RU 718 and DU 732 to serve UE 701 over F3. CU 741 notifies AMF 724 of the cell reselection to F3 and RU 718. UE 701 attaches to CU 741 over RU 718 and DU 732. Over RU 718, DU 732, and CU 741, UE 701 instructs SMF 726 to activate the authorized URLLC slice in response to the PDU establishment request as described with respect to FIGS. 4 and 5. In response, SMF 726 selects URLLC bearer QoS and addressing for UE 701. SMF 726 selects and controls URLLC UPF 722 to serve the URLLC bearer to CU 741 per the QoS and addressing. AMF 724 controls CU 741 to serve the URLLC bearer between UE 701 and URLLC UPF 722 over F3, RU 718, and DU 732 using handovers. CU 741 signals DU 732 and RU 718 to deliver the URLLC bearer over F3 per the URLLC QoS and addressing. CU 741 signals UE 701 over DU 732 and RU 718 to use the URLLC bearer over F3 and to use handovers for the URLLC slice. UE 701 and URLLC UPF 722 now exchange user data over F3, RU 718, DU 732, and CU 741.

As UE 701 moves about, UE 701 and CU 741 may perform handovers for the URLLC slice over F3 from RU 718 to RUs 716-717 (or another RU or band). If UE 701 is accessing a different network slice via one or more other RUs, UE 701 and CU 741 may perform handovers for the eMBB slices over F2 from RU 715 to RU 713-714 (or another RU or band), and UE 701 and CU 441 may perform handovers for the mMTC slices over F1 from RU 712 to RU 711 (or another RU or band). However, the handovers ideally remain on the same OFB as originated as preferred, and/or are handed to a cell operating at the preferred OFB if not available when the PDU was established. For example, prior to a handover, the network circuitry 103 may exchange information with the user circuitry 102, and user circuitry 102 may process the uplink interference threshold (and other slicing policy criteria, if used) and identify the preferred OFB for the network circuitry 103 to measure prior to a handover. If the measurement reveals a target cell is suitable over the preferred OFB, the handover may be to the target cell.

Figure 8:
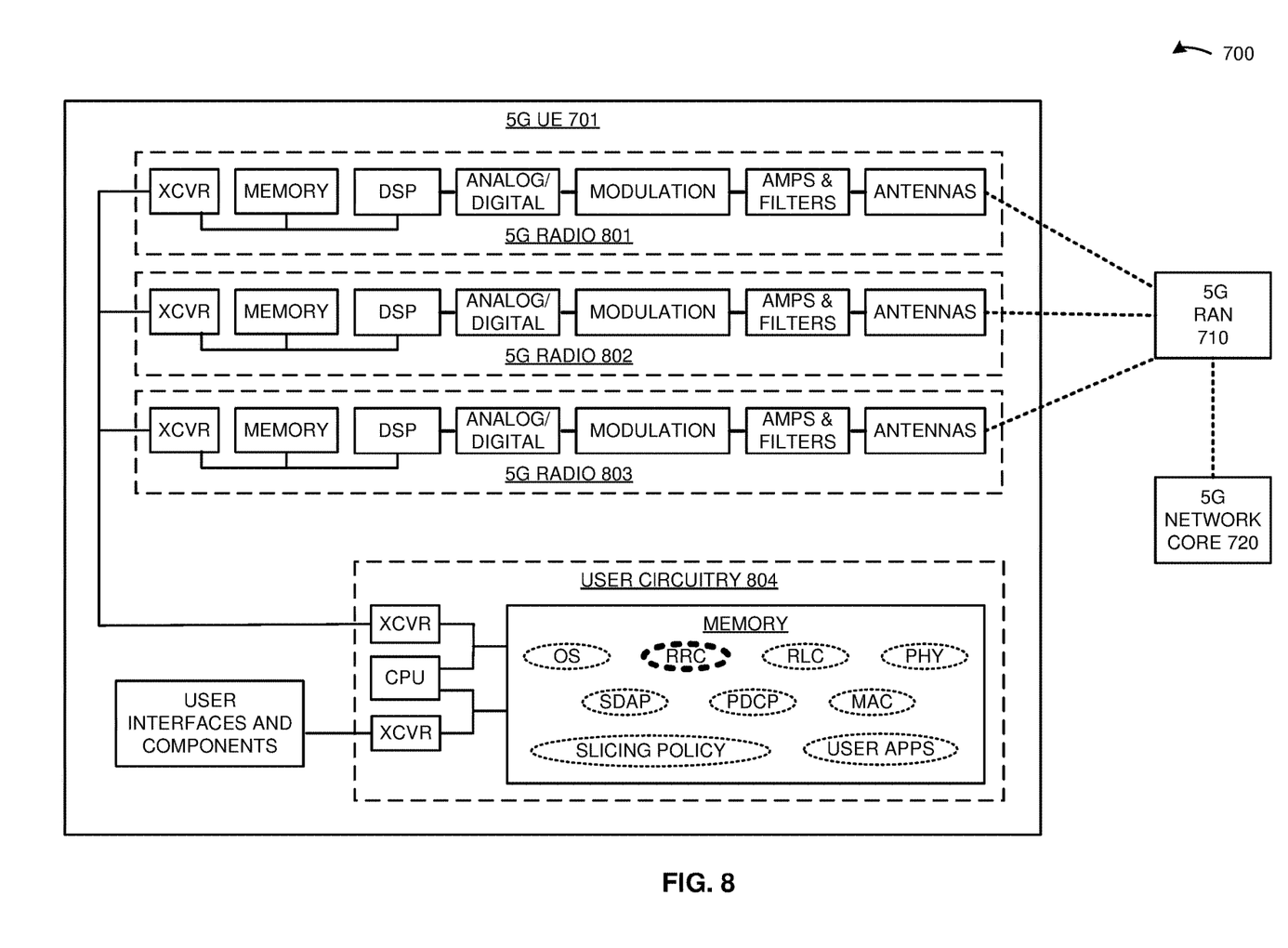
FIG. 8 illustrates the 5G UE that identifies a preferred operating frequency band and slice service type for user applications.

FIG. 8 illustrates 5G UE 701 that identifies a preferred operating frequency band and slice service type for user applications. UE 701 comprises an example of UE 101, although UE 101 may differ. UE 701 comprises 5GNR radios 801-803 and user circuitry 804. 5GNR radios 801-803 comprise antennas, amplifiers, filters, modulation, analog-to-digital interfaces, DSP, memory, and transceivers that are coupled over bus circuitry. User circuitry 804 comprises memory, CPU, user interfaces and components, and transceivers that are coupled over bus circuitry. The memory in user circuitry 804 stores an operating system, user applications (USER APPS), the slicing policy (e.g., slicing policy table 600), and 5GNR network applications for PHY, MAC, RLC, PDCP, SDAP, and RRC. The antennas in 5GNR radios 801-803 are wirelessly coupled to 5G RAN 710 over OFBs F1-F3. Transceivers in 5GNR radios 801-803 are coupled to a transceiver in user circuitry 804. A transceiver in user circuitry 804 is typically coupled to the user interfaces and components like displays, controllers, and memory. The CPU in user circuitry 804 executes the operating system, PHY, MAC, RLC, PDCP, SDAP, and RRC to exchange 5GNR signaling and data with 5G RAN 510 over 5GNR radios 801-803.

In 5GNR radios 801-803, the antennas receive wireless signals from 5G RAN 710 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency (F1-F3). The analog/digital interfaces convert the demodulated analog signals into digital signals for the DSPs. The DSPs transfer corresponding 5GNR symbols to user circuitry 804 over the transceivers. In user circuitry 804, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the low-latency user applications. The 5GNR network applications process the new uplink 5GNR signaling and low-latency user data to generate corresponding uplink 5GNR symbols that carry the uplink 5GNR signaling and data. In 5GNR radios 801-803, the DSPs process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency (F1-F3). The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 710 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

Based on signal strength detected by radio 801, the RRC in UE 701 wirelessly attaches to RU 711 in RAN 710 over OFB F1 and exchanges attachment signaling with CU 741. The RRC in UE 701 requests OFBs F1-F3 and eMBB, URLLC, and mMTC slices to AMF 724 in network core 720 over 5G RAN 710. AMF 724 indicates authorized F1-F3 bands and authorized eMBB, URLLC, and mMTC slices to the RRC in UE 701 over 5G RAN 710.

UE 701 executes a video-conferencing application and selects the corresponding and authorized eMBB slice service type. UE 701 processes the uplink interference threshold for RU 711 and identifies the preferred OFB F2 based on the slicing policy. In response to selecting the eMBB slice and identifying F2 as the preferred OFB, UE 701 measures the F2 signal (e.g., SINR, RSRP, or any other appropriate measurement), of RUs 713-715 and transfers a cell reselection request to F2 based on the measurement being suitable. For example, 5G radio 902 and the F2 PHY measure the response of RUs 713-715 in 5G RAN 710. The RRC transfers a cell addition request for F2 and an F2 report to CU 741. CU 741 selects RU 715 based on the best F2 signal and directs the RRC in UE 701 to attach to RU 715 over F2. UE 701 attaches to RU 715 over F2. The RRC in UE 701 instructs SMF 726 to activate the authorized eMBB slice. CU 741 signals the RRC in UE 701 to use the eMBB bearer over F2. The SDAP in UE 701 and eMBB UPF 721 now exchange eMBB user data over radio 802, F2, RU 715, DU 732, and CU 741 to support the video-conferencing application.

As UE 701 moves about, the RRC in UE 701 and CU 741 may perform handovers for the eMBB slice over F2 from RU 715 to RUs 713 or 714 (or another RU or band). Handovers ideally remain on the same OFB as originated as preferred, and/or are handed to a cell operating at the preferred OFB if not available when the PDU was established. For example, prior to a handover, the network circuitry 103 may exchange information with the user circuitry 102, and user circuitry 102 may process the uplink interference threshold (and/or other slicing policy criteria, if used) and identify the preferred OFB for the network circuitry 103 to measure prior to a handover. If the measurement reveals a target cell is suitable over the preferred OFB, the handover may be to the target cell.

The wireless data network circuitry described above comprises computer hardware and software that form special-purpose UE circuitry to use specific handover types for specific wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose UE circuitry to use specific handover types for specific wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless User Equipment (UE) to use a target operating frequency band for a network slice, the method comprising:
   user circuitry identifying a slice service type;
   the user circuitry processing an uplink interference threshold of a target cell based on the slice service type;
   the user circuitry identifying a preferred operating frequency band based on the slice service type and the uplink interference threshold of the target cell;

the user circuitry transferring a service request for a wireless data service having the slice service type over the preferred operating frequency band to network circuitry; and the network circuitry wirelessly exchanging data with a wireless access node associated with the target cell over the preferred operating frequency band to establish a packet data unit session comprising the slice service type.

2. The method of claim 1, further comprising:
the user circuitry launching an application, wherein identifying the slice service type is based on an association between the application and the slice service type.

3. The method of claim 1, further comprising:
the network circuitry receiving the uplink interference threshold of the target cell via a broadcast message from a wireless access node comprising the target cell.

4. The method of claim 1, further comprising:
the network circuitry determining that the wireless UE is not camped on a cell using the preferred operating frequency band;
the network circuitry measuring the preferred operating frequency band;
the network circuitry determining that the preferred operating frequency band is suitable based on the measuring the preferred operating frequency band; and
the network circuitry completing a cell reselection to the target cell using the preferred operating frequency band in response to determining the preferred operating frequency band is suitable.

5. The method of claim 1, wherein the preferred operating frequency band is one of a plurality of operating frequency bands on a ranked list of operating frequency bands generated based on the slice service type and the uplink interference threshold of the target cell, the method further comprising:
the network circuitry measuring, in ranked order, the operating frequency bands of the ranked list of operating frequency bands to identify the preferred operating frequency band based on the measuring indicating the operating frequency band is suitable; and
the network circuitry completing a cell reselection to the target cell using the preferred operating frequency band in response to identifying the preferred operating frequency band from the ranked list of operating frequency bands.

6. The method of claim 1, wherein the user circuitry identifying the preferred operating frequency band comprises the user circuitry searching a slicing policy in a memory of the wireless UE for the preferred operating frequency band based on the slice service type and the uplink interference threshold of the target cell.

7. The method of claim 6, further comprising:
the user circuitry updating memory with uplink interference threshold data in response to receiving new broadcast messages, wherein the updated uplink interference threshold data is used for processing the uplink interference threshold of the target cell on future requests.

8. The method of claim 1, further comprising:
the network circuitry requesting authorization, from a wireless network core over the preferred operating frequency band of the target cell, to access a network slice comprising the slice service type.

9. The method of claim 1, wherein the slice service type comprises one of enhanced Mobile Broadband (eMBB), Ultra Reliable Low Latency Communications (URLLC), or massive Machine Type Communications (mMTC).

10. The method of claim 1, wherein the user circuitry identifying the preferred operating frequency band is further based on a loading threshold of the target cell, a mobility condition of the wireless UE, or a combination thereof.

11. A wireless User Equipment (UE) to use a target operating frequency band, the wireless UE comprising:
user circuitry configured to identify a slice service type;
the user circuitry configured to process an uplink interference threshold of a target cell based on the slice service type;
the user circuitry configured to identify a preferred operating frequency band based on the slice service type and the uplink interference threshold of the target cell;
the user circuitry configured to transfer a service request for a wireless data service having the slice service type over the preferred operating frequency band to network circuitry; and
the network circuitry configured to exchange data with a wireless access node associated with the target cell over the preferred operating frequency band to establish a packet data unit session comprising the slice service type.

12. The wireless UE of claim 11, wherein:
the user circuitry is configured to launch an application, wherein the user circuitry identifies the slice service type based on an association between the application and the slice service type.

13. The wireless UE of claim 11, wherein:
the network circuitry is configured to receive the uplink interference threshold of the target cell via a broadcast message from a wireless access node comprising the target cell.

14. The wireless UE of claim 11, wherein:
the network circuitry is configured to determine that the wireless UE is not camped on the target cell using the preferred operating frequency band;
the network circuitry is configured to measure the preferred operating frequency band;
the network circuitry is configured to determine that the preferred operating frequency band is suitable based on the measuring the preferred operating frequency band; and
the network circuitry is configured to complete a cell reselection to the target cell using the preferred operating frequency band in response to determining the preferred operating frequency band is suitable.

15. The wireless UE of claim 11, wherein the preferred operating frequency band is one of a plurality of operating frequency bands on a ranked list of operating frequency bands generated based on the slice service type and the uplink interference threshold of the target cell, and wherein:
the network circuitry is configured to measure, in ranked order, the operating frequency bands of the ranked list of operating frequency bands to identify the preferred operating frequency band based on the measuring indicating the operating frequency band is suitable; and
the network circuitry is configured to complete a cell reselection to the target cell using the preferred operating frequency band in response to identifying the preferred operating frequency band from the ranked list of operating frequency bands.

16. The wireless UE of claim 11, wherein the user circuitry identifying the preferred operating frequency band comprises:
the user circuitry search a slicing policy in a memory of the wireless UE for the preferred operating frequency band based on the slice service type and the uplink interference threshold of the target cell.

17. The wireless UE of claim 16, wherein:
the user circuitry is configured to update memory with uplink interference threshold data in response to receiving new broadcast messages, wherein the updated uplink interference threshold data is used for processing the uplink interference threshold of the target cell on future requests.

18. The wireless UE of claim 11, wherein:
the network circuitry is configured to request authorization, from a wireless network core over the preferred operating frequency band of the target cell, to access a network slice comprising the slice service type.

19. The wireless UE of claim 11, wherein the slice service type comprises one of enhanced Mobile Broadband (eMBB), Ultra Reliable Low Latency Communications (URLLC), or massive Machine Type Communications (mMTC).

20. The wireless UE of claim 11, wherein the user circuitry identifying the preferred operating frequency band is further based on a loading threshold of the target cell, a mobility condition of the wireless UE, or a combination thereof.

* * * * *